United States Patent
Gava

(10) Patent No.: US 7,672,880 B2
(45) Date of Patent: Mar. 2, 2010

(54) AUTOMATED ACCOUNTING SYSTEM, METHOD AND COMPUTER-READABLE MEDIUM FOR MFP DEVICES

(75) Inventor: Fabio M. Gava, Irvine, CA (US)

(73) Assignees: Toshiba Corporation (JP); Toshiba Tec Kabushiki Kaisha (JP)

(*) Notice: Subject to any disclaimer, the term of this patent is extended or adjusted under 35 U.S.C. 154(b) by 1383 days.

(21) Appl. No.: 10/675,773

(22) Filed: Sep. 30, 2003

(65) Prior Publication Data

US 2005/0071739 A1    Mar. 31, 2005

(51) Int. Cl.
*G07B 17/00* (2006.01)
(52) U.S. Cl. .................................... 705/30
(58) Field of Classification Search ............ 705/30, 705/1
See application file for complete search history.

(56) References Cited

U.S. PATENT DOCUMENTS

| | | | |
|---|---|---|---|
| 5,146,344 A | | 9/1992 | Bennett et al. |
| 5,168,444 A | * | 12/1992 | Cukor et al. ............. 705/1 |
| 5,678,046 A | * | 10/1997 | Cahill et al. ........... 707/200 |
| 5,745,883 A | | 4/1998 | Krist et al. |
| 5,903,801 A | | 5/1999 | Nakamura |
| 5,956,698 A | | 9/1999 | Lacheze et al. |
| 6,025,925 A | | 2/2000 | Davidson, Jr. et al. |
| 6,026,380 A | | 2/2000 | Weiler et al. |
| 6,216,113 B1 | * | 4/2001 | Aikens et al. .......... 705/34 |
| 6,347,319 B1 | * | 2/2002 | Moore ............... 705/36 R |
| 6,385,675 B1 | | 5/2002 | Yamaguchi |
| 6,411,943 B1 | * | 6/2002 | Crawford ............ 705/400 |
| 6,452,689 B1 | | 9/2002 | Srinivasan |
| 6,484,934 B2 | | 11/2002 | Salgado |
| 6,498,912 B1 | | 12/2002 | Leni et al. |
| 6,535,297 B1 | | 3/2003 | Steele et al. |
| 6,581,092 B1 | | 6/2003 | Motoyama et al. |
| 6,629,081 B1 | * | 9/2003 | Cornelius et al. ......... 705/30 |
| 6,910,021 B2 | * | 6/2005 | Brown et al. ............. 705/40 |
| 7,069,234 B1 | * | 6/2006 | Cornelius et al. ......... 705/26 |
| 7,080,051 B1 | * | 7/2006 | Crawford ............. 705/400 |
| 7,200,571 B1 | * | 4/2007 | Jenniges et al. .......... 705/37 |
| 7,213,064 B2 | * | 5/2007 | Smith et al. ............ 709/223 |
| 2002/0147668 A1 | * | 10/2002 | Smith et al. ............. 705/30 |
| 2003/0105643 A1 | | 6/2003 | Chen et al. |
| 2003/0107762 A1 | | 6/2003 | Kinoshita et al. |

FOREIGN PATENT DOCUMENTS

| | | |
|---|---|---|
| EP | 0 478 347 A2 | 4/1992 |
| EP | 0 996 041 A2 | 4/2000 |
| GB | 2 353 971 A | 3/2001 |
| WO | WO-00/62233 A1 | 10/2000 |
| WO | WO-02/061542 A2 | 8/2002 |

OTHER PUBLICATIONS

"Konica Minolta first MFP manufacturer and distributor awarded new EcoLogo certification." Canada NewsWire Apr. 15, 2009 ProQuest Newsstand, ProQuest. Web. Sep. 17, 2009.*

* cited by examiner

*Primary Examiner*—Matthew S Gart
*Assistant Examiner*—Oluseye Iwarere
(74) *Attorney, Agent, or Firm*—Tucker Ellis & West LLP

(57) ABSTRACT

The present invention is directed to a system and method for automated accounting of document reading device usage. The system and method include a configurable accounting agent adapted to automatically generate usage reports of the document generating device and transmit the reports to one or more destinations.

24 Claims, 3 Drawing Sheets

AUTOMATED ACCOUNTING SYSTEM, METHOD AND COMPUTER-READABLE MEDIUM FOR MFP DEVICES

BACKGROUND OF THE INVENTION

This invention is directed to a system and method for automated accounting of document generating device usage. More particularly, this invention is directed to a system and method for periodically receiving usage data of a document generating device or multifunctional peripheral.

In order to reduce operational costs, small businesses will outsource copying, printing, scanning, and facsimile services to printing businesses or similar types of establishments. Further, corporations will typically share document generating devices or multifunctional peripherals among different departments. Document generating devices or multifunctional peripherals are therefore equipped with accounting features and systems to report different customer or department usage information. Such systems typically consist of an accounting database and a set of counters as known in the art associated with each account. Any operation performed on the document generating device or multifunctional peripheral, such as copying, printing, or scanning, is charged under a different account increasing the counter associated with the account by one.

Accounting administrators may obtain reports of usage per account. Currently, the accounting administrator must obtain the information directly from the document generating device in order for the customer or department to be billed. The accounting administrator must physically access the document generating device on a regular basis to obtain the usage data needed to properly bill the customer or department.

It is desirable to have a system and method for automated accounting of document generating device usage.

SUMMARY OF THE INVENTION

In accordance with the present invention, there is provided a system and method for automated accounting of document generating device usage.

Further, in accordance with the present invention, there is provided a system and method with a configurable accounting agent adapted to automatically generate usage reports of the document generating device and transmit the reports to one or more destinations.

Still further, in accordance with the present invention, there is provided a system for automated accounting of document generating device usage comprising means adapted for acquiring usage data representative of usage of a document generating device in accordance with a selected one of a plurality of user accounts and means adapted for storing report data representative of a data reporting period. The system also comprises reporting means adapted for periodically outputting the usage data to an associated accounting administrator in accordance with the report data.

In a preferred embodiment, the output or reports are transmitted to at least one destinations, such as electronic mail server, a document management system, an image generating device, and an Internet server. In a preferred embodiment, the system includes means adapted for selecting the parameters for outputting or reporting the usage data.

Still further, in accordance with the present invention, there is provided a method for automated accounting of document generating device usage comprising the steps of acquiring usage data representative of usage of a document generating device in accordance with a selected one of a plurality of user accounts and storing report data representative of a data reporting period. The method also comprises the step of periodically outputting the usage data to an associated accounting administrator in accordance with the report data.

In a preferred embodiment, the output or reports are transmitted to at least one destinations, such as electronic mail server, a document management system, an image generating device, and an Internet server. In a preferred embodiment, the method also comprises selecting the parameters for outputting or reporting the usage data.

These and other advantages, aspects, and features will be understood by one of ordinary skill in the art upon reading and understanding the specification.

DETAILED DESCRIPTION OF THE PREFERRED EMBODIMENT

The present invention is directed to a system and method for automated accounting of document reading device usage. The system and method include a configurable accounting agent adapted to automatically generate usage reports of the document generating device and transmit the reports to one or more destinations.

Figure 1:
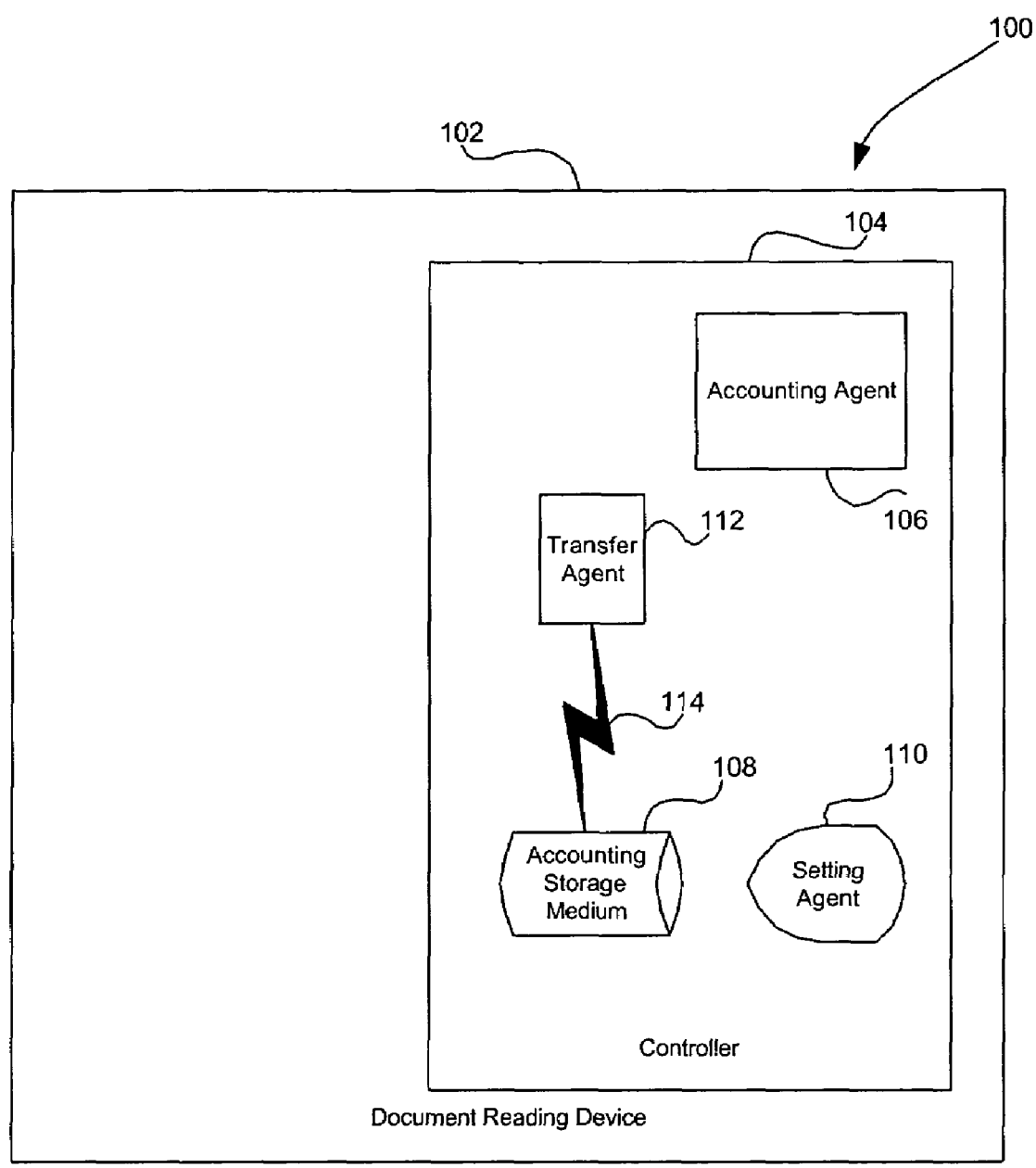
FIG. 1 is a block diagram of the system according to the present invention.

FIG. 1 shows a block diagram preferred embodiment of the system according to the present invention generally designated as 100. The system comprises at least one document reading device, as illustrated by device 102, such as a scanner or copier, for generating image data. The document reading device is any suitable document reading device known in the art. Preferably, the document reading device is a scanning device, a copying device, a facsimile device, a printing device, or a multifunctional peripheral. More preferably, the document reading device is a scanning device. Suitable commercially available document reading devices include, but are not limited to, the Toshiba e-Studio Series Controller.

The document reading device further comprises a controller 104 which controls the functions of the document reading device. The controller comprises an accounting agent 106 that collects selected accounting information for a plurality of user accounts via any suitable means. Preferably, the accounting agent collects the accounting information via a set of counters as known in the art. The controller also comprises an accounting storage medium 108 for storing selected accounting data for a plurality of user accounts. The controller further comprises means adapted to select the parameters for outputting or reporting usage data or setting agent 110, such as a graphical user interface or display.

A Transfer Agent 112 is used to access the accounting or usage data on the controller. An data transfer session is initiated on the communication link 114 whereupon the usage data is transferred to the transfer agent via a data transfer system. The communication link is comprised of one or more segments of wired or wireless communications.

Figure 2:
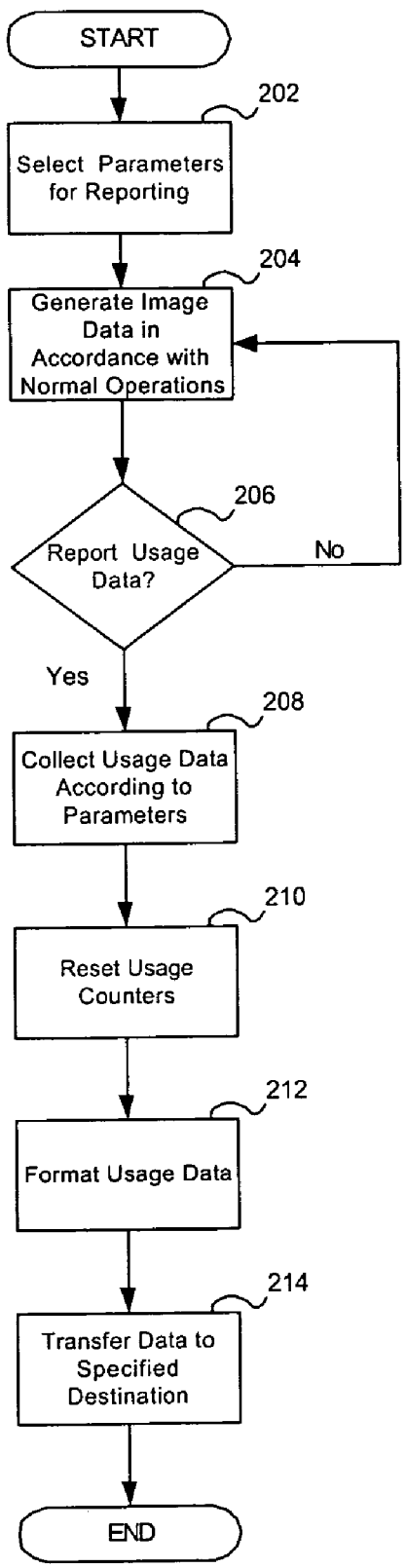
FIG. 2 is a flow chart illustrating the method according to the present invention.

FIG. 2 illustrates a flow chart 200 for automating accounting of usage data according to the present invention. At 202, an accounting administrator or other administrative user would select the parameters for reporting the accounting usage via any suitable means. In a preferred embodiment, access to the system to select the parameters is restricted to certain users who provide the appropriate information, such as username and password, to gain access to the setting agent. The accounting administrator suitably accesses the setting agent via any suitable means, such as remotely via a suitable communications link or by physically accessing the setting agent on the document reading device.

Figure 3:
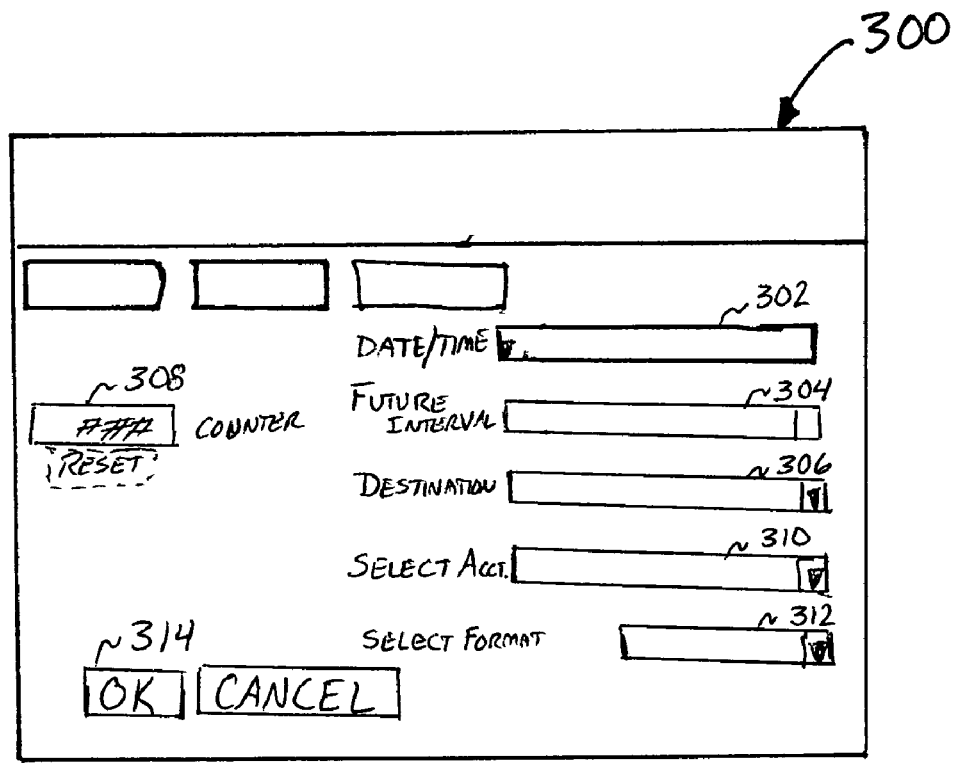
FIG. 3 is a sample template for selecting the parameters for outputting or reporting the usage data.

FIG. 3 is shows a sample template 300 for selecting the parameters for reporting usage data. The accounting administrator provides the date and time that the usage data are to be retrieved or reported at 302. The accounting administrator enters the time interval at which future usage data are to be retrieved or reported at 304. At 306, the accounting administrator enters the destination to which the usage data is to be sent. The accounting administrator may also suitably enter any specific information for the destination. Preferably, the usage data are routed via electronic mail transmission, facsimile transmission, FTP transmission, and HTML transmission. Preferably, the usage data are routed to the following types of destinations: electronic mail server, a document management system, an image generating device, and an Internet server. In one embodiment, the usage data are suitably sent to a plurality of destinations.

At 308, the accounting administrator checks if the counter means are to be reset after reporting the usage data. At 310, the accounting administrator enters information regarding which usage data are to be collected, such as the user accounts to be reported. Any suitable filters or restrictions are suitably entered to restrict the usage data to that desired. At 312, the accounting administrator specifies the file format for the usage data, such as a CSV file or an Excel spreadsheet. The accounting administrator selects Ok 314 to select the parameters and Cancel 316 to cancel the settings.

At 204, the document generating device generates image data in its normal course. At 206, a determination is made whether to report the usage data to the accounting administrator. The document generating device determines if the predefined time interval as specified by the accounting administrator has passed via any suitable means. If the predefined time interval has not passed, the document generating device does not start the process to report the usage data, and flow returns to 204. If the predefined time interval has passed, flow proceeds to 208 wherein the accounting agent collects the usage data in accordance with the parameters selected by the accounting administrator via any suitable means. The accounting agent only collects the usage data as specified by any filters or restrictions specified by the accounting administrator. At 210, any account counters selected to reset by the accounting administrator are reset.

At 212, the accounting agent formats the usage data into a the specified file format as set by the accounting administrator. At 214, the Transfer Agent transfers the usage data to the specified destination or destinations as set by the accounting administrator.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for automated accounting of document generating device usage comprising a plurality of document generating devices, each document generating device including:
    means adapted for receiving, from an associated accounting administrator via an associated data network, restriction data corresponding to a selected information filter;
    means adapted for acquiring usage data limited by the restriction data in accordance with the selected information filter, the acquired usage data being representative of usage of a document generating device in accordance with a selected one of a plurality of user accounts, wherein the acquired usage data includes, in accordance with the selected information filter, at least one of:
        copier usage data representative of a number of copies made in accordance with each of the plurality of user accounts,
        print usage data representative of a number of prints made in accordance with each of the plurality of user accounts,
        facsimile usage data representative of a number of facsimile transmissions made in accordance with each of the plurality of user accounts, and
        scanning usage data representative of a number of scanning images made in accordance with each of the plurality of user accounts;
    means adapted for receiving, from the associated accounting administrator via the associated data network, report period data corresponding to a selected timing for transmission of the acquired usage data;
    means adapted for locally storing the accumulated usage data from each of a plurality of document generating device operations as accumulated usage data;
    means adapted for locally storing received report period data;
    an interval counter adapted for outputting time data corresponding to a preselected reporting period interval;
    reporting means adapted for automatically periodically outputting, via the data network, the usage data to the associated accounting administrator in accordance with the report period data and the time data and without input from the associated accounting administrator so as to include a timed output of the accumulated usage data acquired during the preselected reporting period interval;
    means adapted for receiving a reset signal from the associated accounting administrator via the data network representative of a reset of at least a portion of accumulated usage data; and
    means adapted for resetting locally stored accumulated usage data to a previous state upon receipt of a reset signal.

2. The system for automated accounting of document generating device usage of claim 1 wherein the reporting means includes means adapted for outputting the accumulated usage data to an associated accounting administrator via at least one of electronic mail transmission, facsimile transmission, FTP transmission, and HTML transmission.

3. The system for automated accounting of document generating device usage of claim 1 wherein the reporting means includes means adapted for outputting the accumulated usage data to at least one of an electronic mail server, a document management system, an image generating device, and an Internet server.

4. The system for automated accounting of document generating device usage of claim 1 wherein the document generating device includes a scanning device, a copying device, a printing device, a facsimile device, and a multifunctional peripheral.

5. The system for automated accounting of document generating device usage of claim 1 wherein the reporting means further includes means adapted for selecting parameters for periodically outputting the accumulated usage data.

6. The system for automated accounting of document generating device usage of claim 5 wherein the means adapted for selecting parameters for periodically outputting the accumulated usage data include means for selecting at least one of data reporting period, user accounts to be reported, format of output, transmission type, destination of output, and usage data included.

7. A method for automated accounting of document generating device usage comprising a plurality of document generating devices, comprising the steps of:
  receiving, from an associated accounting administrator via an associated network, restriction data corresponding to a selected information filter;
  acquiring usage data limited by the restriction data in accordance with the selected information filter, the acquired usage data being representative of usage of a document generating device in accordance with a selected one of a plurality of user accounts, wherein the acquired usage data includes, in accordance with the selected information filter, at least one of:
    copier usage data representative of a number of copies made in accordance with each of the plurality of user accounts,
    print usage data representative of a number of prints made in accordance with each of the plurality of user accounts,
    facsimile usage data representative of a number of facsimile transmissions made in accordance with each of the plurality of user accounts, and
    scanning usage data representative of a number of scanning images made in accordance with each of the plurality of user accounts;
  receiving, from the associated accounting administrator via the associated data network, report period data corresponding to a selected timing for transmission of the acquired usage data;
  locally storing the acquired usage data from each of a plurality of document generating device operations as accumulated usage data;
  locally storing received report period data;
  outputting time data corresponding to a preselected reporting period interval;
  automatically periodically outputting, via the data network, the accumulated usage data to the associated accounting administrator in accordance with the report period data and the time data and without input from the associated accounting administrator so as to include a timed output of the accumulated usage data acquired during the reporting period interval;
  receiving a reset signal from the associated accounting administrator via the data network representative of a reset of at least a portion of accumulated usage data; and
  resetting locally stored accumulated usage data to a previous state upon receipt of a reset signal.

8. The method for automated accounting of document generating device usage of claim 7 wherein the reporting step includes outputting the accumulated usage data to an associated accounting administrator via at least one of electronic mail transmission, facsimile transmission, FTP transmission, and HTML transmission.

9. The method for automated accounting of document generating device usage of claim 7 wherein the reporting step includes outputting the accumulated usage data to at least one of an electronic mail server, a document management system, an image generating device, and an Internet server.

10. The method for automated accounting of document generating device usage of claim 7 wherein the document generating device includes a scanning device, a copying device, a printing device, a facsimile device, and a multifunctional peripheral.

11. The method for automated accounting of document generating device usage of claim 7 wherein the reporting step includes selecting parameters for periodically outputting the accumulated usage data.

12. The method for automated accounting of document generating device usage of claim 11 wherein the selecting parameters for periodically outputting the accumulated usage data includes selecting at least one of data reporting period, user accounts to be reported, format of output, transmission type, destination of output, and usage data included.

13. A computer-readable medium for automated accounting of document generating device usage comprising a plurality of document generating devices, each document generating device including:
  means adapted for receiving, from an associated accounting administrator via an associated data network, restriction data corresponding to a selected information filter;
  means adapted for acquiring usage data limited by the restriction data in accordance with the selected information filter, the acquired usage data being representative of usage of a document generating device in accordance with a selected one of a plurality of user accounts, wherein the acquired usage data includes at least one of:
    copier usage data representative of a number of copies made in accordance with each of the plurality of user accounts,
    print usage data representative of a number of prints made in accordance with each of the plurality of user accounts,
    facsimile usage data representative of a number of facsimile transmissions made in accordance with each of the plurality of user accounts, and
    scanning usage data representative of a number of scanning images made in accordance with each of the plurality of user accounts;
  means adapted for receiving, from the associated accounting administrator via the associated data network, report period data corresponding to a selected timing for transmission of acquired usage data;
  means adapted for locally storing the acquired usage data from each of a plurality of document generating device operations as accumulated data;
  means adapted for locally storing received report period data;
  an interval counter adapted for outputting time data corresponding to a preselected reporting period interval;
  reporting means adapted for automatically periodically outputting, via the data network, the accumulated usage data to the associated accounting administrator in accordance with the report period data and the time data and without input from the associated accounting administrator so as to include a timed output of the accumulated usage data acquired during the reporting period interval;

means adapted for receiving a reset signal from the associated accounting administrator via the data network representative of a reset of at least a portion of accumulated usage data; and means adapted for resetting locally stored accumulated usage data to a previous state upon receipt of a reset signal.

14. The computer-readable medium for automated accounting of document generating device usage of claim 13 wherein the reporting means includes means adapted for outputting the accumulated usage data to an associated accounting administrator via at least one of electronic mail transmission, facsimile transmission, FTP transmission, and HTML transmission.

15. The computer-readable medium for automated accounting of document generating device usage of claim 13 wherein the reporting means includes means adapted for outputting the accumulated usage data to at least one of an electronic mail server, a document management system, an image generating device, and an Internet server.

16. The computer-readable medium for automated accounting of document generating device usage of claim 13 wherein the document generating device includes a scanning device, a copying device, a printing device, a facsimile device, and a multifunctional peripheral.

17. The computer-readable medium for automated accounting of document generating device usage of claim 13 wherein the reporting means further includes means adapted for selecting parameters for periodically outputting the accumulated usage data.

18. The computer-readable medium for automated accounting of document generating device usage of claim 17 wherein the means adapted for selecting parameters for periodically outputting the accumulated usage data include means for selecting at least one of data reporting period, user accounts to be reported, format of output, transmission type, destination of output, and usage data included.

19. A computer-implemented method for automated accounting of document generating device usage comprising a plurality of document generating devices, comprising the steps of:

receiving, from an associated accounting administrator via an associated data network, restriction data corresponding to a selected information filter;

acquiring usage data limited by the restriction data in accordance with the selected information filter, the acquired usage data being representative of usage of a document generating device in accordance with a selected one of a plurality of user accounts, wherein the acquired usage data includes, in accordance with the selected information filter, at least one of:

copier usage data representative of a number of copies made in accordance with each of the plurality of user accounts, print usage data representative of a number of prints made in accordance with each of the plurality of user accounts, facsimile usage data representative of a number of facsimile transmissions made in accordance with each of the plurality of user accounts, and scanning usage data representative of a number of scanning images made in accordance with each of the plurality of user accounts;

receiving, from the associated accounting administrator via the associated data network, report period data corresponding to a selected timing for transmission of the acquired usage data;

locally storing the acquired usage data from each of a plurality of document generating device operations as accumulated usage data;

locally storing received report period data;

outputting time data corresponding to a preselected reporting period interval;

automatically periodically outputting, via the data network, the accumulated usage data to the associated accounting administrator in accordance with the report period data and the time data and without input from the associated accounting administrator so as to include a timed output of the accumulated usage data acquired during the reporting period interval;

receiving a reset signal from the associated accounting administrator via the data network representative of a reset of at least a portion of accumulated usage data; and resetting locally stored accumulated usage data to a previous state upon receipt of reset signal.

20. The computer-implemented method for automated accounting of document generating device usage of claim 19 wherein the reporting step includes outputting the accumulated usage data to an associated accounting administrator via at least one of electronic mail transmission, facsimile transmission, FTP transmission, and HTML transmission.

21. The computer-implemented method for automated accounting of document generating device usage of claim 19 wherein the reporting step includes outputting the accumulated usage data to at least one of an electronic mail server, a document management system, an image generating device, and an Internet server.

22. The computer-implemented method for automated accounting of document generating device usage of claim 19 wherein the document generating device includes a scanning device, a copying device, a printing device, a facsimile device, and a multifunctional peripheral.

23. The computer-implemented method for automated accounting of document generating device usage of claim 19 wherein the reporting step includes selecting parameters for periodically outputting the accumulated usage data.

24. The computer-implemented method for automated accounting of document generating device usage of claim 23 wherein the selecting parameters for periodically outputting the accumulated usage data includes selecting at least one of data reporting period, user accounts to be reported, format of output, transmission type, destination of output, and usage data included.

* * * * *